J. S. PEOPLES.
CARTRIDGE BELT CLAMP.
APPLICATION FILED NOV. 16, 1918.
1,376,354.
Patented Apr. 26, 1921.
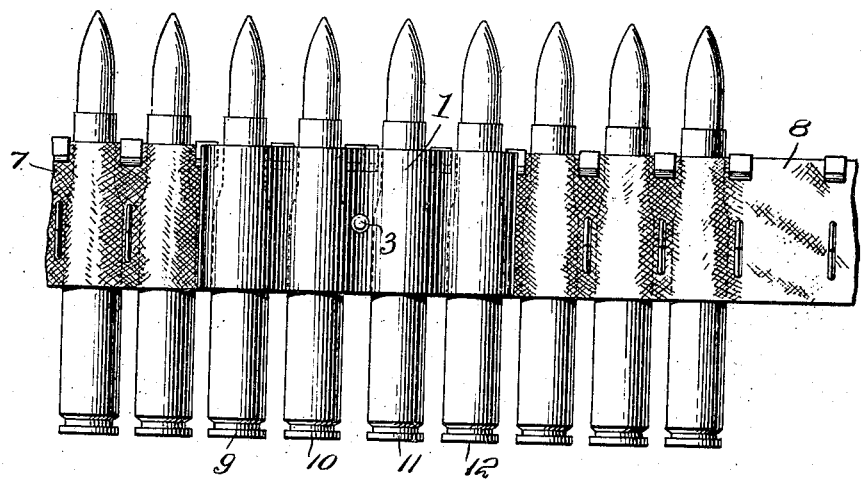
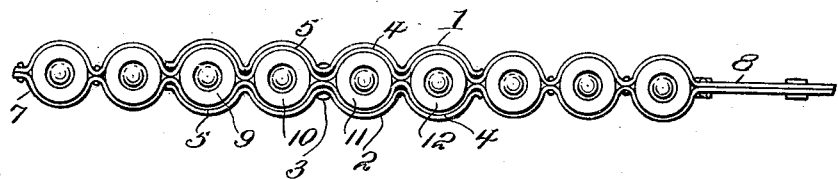
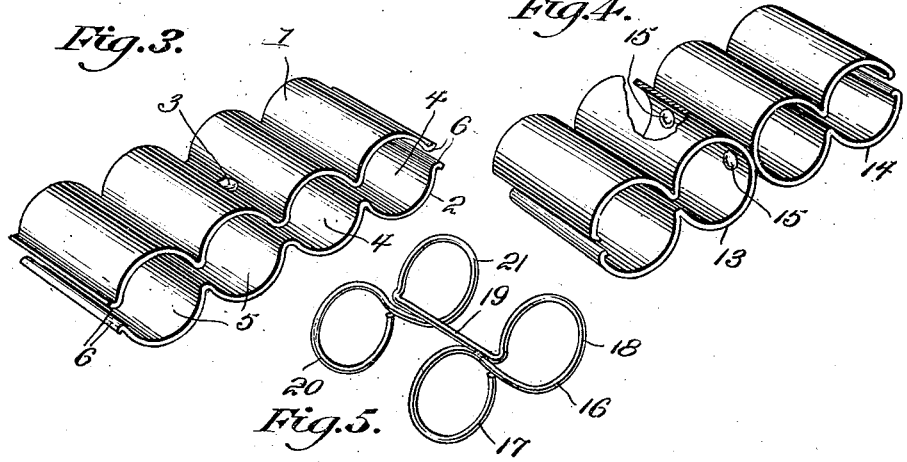
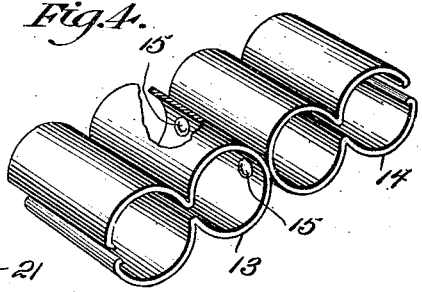
Inventor
John S. Peoples

UNITED STATES PATENT OFFICE.

JOHN S. PEOPLES, OF THE UNITED STATES ARMY, ASSIGNOR TO NEWTON D. BAKER, SECRETARY OF WAR, TRUSTEE.

CARTRIDGE-BELT CLAMP.

1,376,354.  Specification of Letters Patent.  Patented Apr. 26, 1921.

Application filed November 16, 1918. Serial No. 262,891.

(FILED UNDER THE ACT OF MARCH 3, 1883, 22 STAT. L., 625.)

*To all whom it may concern:*

Be it known that I, JOHN S. PEOPLES, Capt., Ordnance Department, U. S. A., a citizen of the United States, stationed at Washington, D. C., have invented an Improvement in Cartridge-Belt Clamps, of which the following is a specification.

The invention described herein may be used by the Government, or any of its officers or employees in prosecution of work for the Government, or by any other person in the United States, without payment of any royalty thereon.

My invention relates to new and useful improvements in cartridge belt clamps and has for its objects to provide a clamp that may be quickly and readily adjusted to cartridges in the adjacent ends of a plurality of cartridge belts so that in reality they form one continuous belt.

Usually a cartridge belt for a machine gun contains 250 cartridges and it is often desired to fire a greater number of rounds without losing time for the insertion of the different belts.

By providing a clamp as hereinafter to be referred to, the end of one string of cartridges may be quickly and readily fastened to the forward end of another string and this may be continued so that any number of cartridge belts may be quickly and readily clamped together forming in reality a long continuous belt thereby doing away with the loss of time incident to the insertion of a plurality of shorter ones.

With these and other objects in view my invention consists of certain new and novel constructions and combination of parts as will be hereinafter more fully described and pointed out in the claims.

Referring now to the drawing—

Figure 1 is a view in elevation of a portion of two cartridge belts with the clamp shown connecting the same.

Fig. 2 is a rear end view of the same.

Fig. 3 is a perspective view of the clamp with the cartridges and belts removed.

Fig. 4 is a perspective view of one modification, and

Fig. 5 is a perspective view of still another form of modification.

Referring now to Figs. 1, 2 and 3 in which the preferred form is shown it will be noticed that the clamp comprises two sections or strips 1 and 2 which are fastened by means of a rivet or screw and each half is pressed or stamped to form substantially circular openings 4 at one side of the rivet and openings 5 at the other, and the ends of these two pieces are flared outwardly as at 6. It is to be noticed too that the two strips 1 and 2 are spaced slightly apart, so as the belt may be passed between them.

When it is desired to clamp the two adjacent ends of the cartridge belts 7 and 8 it is only necessary to pass the two cartridges 9 and 10 of one belt in the openings 5 formed in the clamp and to place the first two cartridges 11 and 12 of the other belt in the openings 4 of the clamp. The clamp is of such size that it snugly holds the cartridges and at the same time will pass through the feeding mechanism of the machine gun.

Referring now to the modification shown in Fig. 4 it will be seen that in this instance a piece of metal is bent to form the member 13 which is substantially U shaped and also has the circular portions stamped therein, similar to the preferred form, and a second similar member 14 is fastened at its rear to the rear of the member 13 by the rivets 15 which may be slightly less in diameter than the holes in the metal so that there will be a little movement between the two. Of course, when it is desired to join the ends of two cartridge belts together it is simply necessary to force the two end cartridges of one belt in the member 13 and the first two cartridges of the other belt in the member 14 and the same will be ready for use.

As to the modification shown in Fig. 5 a piece of wire is bent to form the loops 17 and 18 and again bent to form a cross bar 19 and the loops 20 and 21.

In this instance the cartridge is to be removed from the belt and the cartridge then passed through the loop 17 and then through the belt and then through the loop 20, and the same procedure is carried out with regards to the first cartridge in the belt to be attached.

By using a clamp to fasten the belts together the fire can be continuous rather than stopping and feeding a new one to the machine.

Having thus described my invention what

I claim as new and desire to secure by Letters Patent is:

1. A cartridge clamp adapted to secure the last cartridge in one cartridge belt and the first cartridge of another belt, said clamp comprising strips being bent to form substantially circular openings, and the ends of said strips being spaced with relation to each other to accommodate portions of said belts.

2. A device of the character described, including a metallic member bent to form cartridge embracing elements for the reception of cartridges adjacent the ends of cartridge belts, whereby the belts are joined together.

3. The combination of a plurality of cartridge belts and a plurality of cartridges in said belts, and a cartridge embracing clamp for securing the adjacent cartridges in said cartridge belts together.

4. A cartridge belt clamp comprising members, said members bent to form circular openings for the reception and retention of cartridges within a cartridge belt.

5. A clamp for securing the adjacent ends of two cartridge belts comprising a member bent to form encircling portions and a second member similar to said member, the two members being connected and capable of a slight movement with relation to each other, the encircling portions of both of said clamps adapted to receive and retain cartridges in adjacent cartridge belts.

6. A device for connecting the opposed ends of two cartridge belts in intimate relation, consisting of a member having means on one side to engage cartridges adjacent the end of one belt and means on the other side to engage cartridges adjacent the end of the other belt.

7. A device for connecting the opposed ends of two cartridge belts in intimate relation, consisting of a connecting member having a clamp on one side to engage cartridges adjacent the end of one belt and a clamp on the other side to engage cartridges adjacent the end of the other belt.

8. In combination with the opposed ends of a pair of cartridge belts, means for connecting said ends to form a unitary structure, consisting of belt engaging means having a space or clearance for the insertion of each belt and cartridges and for the passage therethrough of said belt and cartridges.

9. In combination with the opposed ends of belts containing cartridges, of a member for connecting said ends having means to permit the entrance of each belt and to engage the belt portions inclosing said cartridges.

10. In combination with a pair of belts containing cartridges, means engaging the ends of the belts, and fitting around the cartridges and belts at the opposed ends of said belts to form a unitary structure of the two belts.

JOHN S. PEOPLES.